United States Patent [19]

Mihara

[11] 4,359,271
[45] Nov. 16, 1982

[54] COMPACT PHOTOGRAPHIC CAMERA LENS SYSTEM HAVING A SHORT OVERALL LENGTH

[75] Inventor: Shin-ichi Mihara, Hachiouji, Japan

[73] Assignee: Olympus Optical Co., Ltd., Tokyo, Japan

[21] Appl. No.: 197,743

[22] Filed: Oct. 16, 1980

[30] Foreign Application Priority Data

Oct. 18, 1979 [JP]   Japan ............................ 54-134624

[51] Int. Cl.³ ...................... G02B 11/22; G02B 13/18
[52] U.S. Cl. ..................................... 350/432; 350/469
[58] Field of Search ..................... 350/469, 432

[56] References Cited

U.S. PATENT DOCUMENTS 3,951,523  4/1976  Nishimoto ......................... 350/432
3,998,527  12/1976  Ikeda et al. ........................ 350/432

FOREIGN PATENT DOCUMENTS 41-6864    4/1966  Japan .
44-10831   5/1969  Japan .
50-145226  11/1975 Japan .
50-145227  11/1975 Japan .

Primary Examiner—John K. Corbin
Assistant Examiner—Rebecca D. Gass
Attorney, Agent, or Firm—Cushman, Darby & Cushman

[57] ABSTRACT

A compact photographic camera lens system having a short overall length, favorably corrected aberrations, especially off axial aberrations and a field angle of at least 63° comprising a first positive meniscus lens component having a convex surface on the object side, a second bisconcave lens component, a third biconvex lens component and a fourth negative meniscus lens component, said fourth lens component having aspherical surfaces on both the sides.

8 Claims, 9 Drawing Figures

FIG. 4
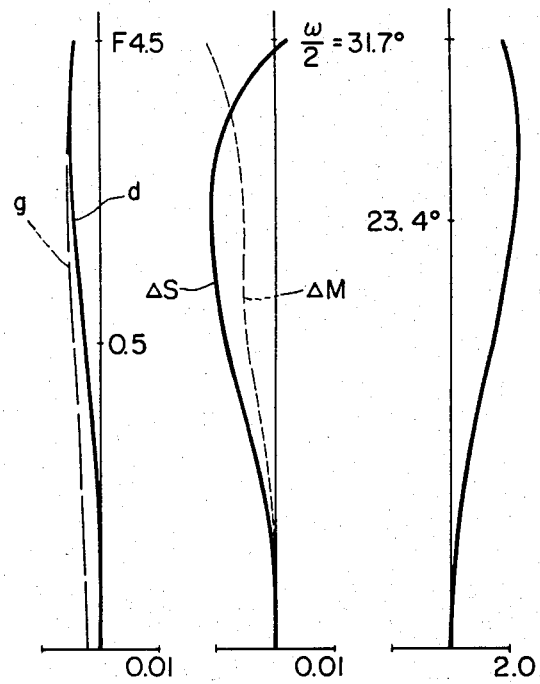
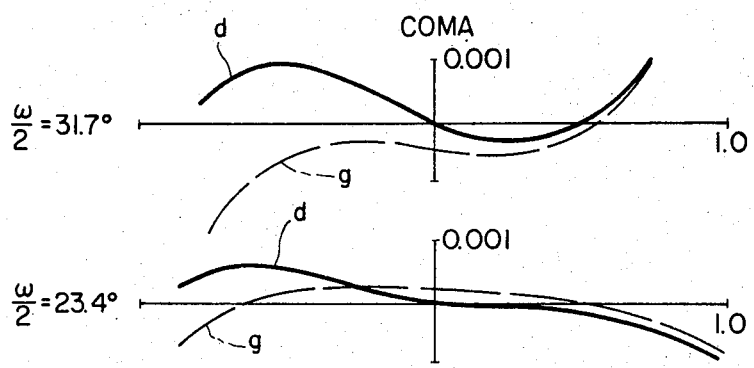

FIG. 5
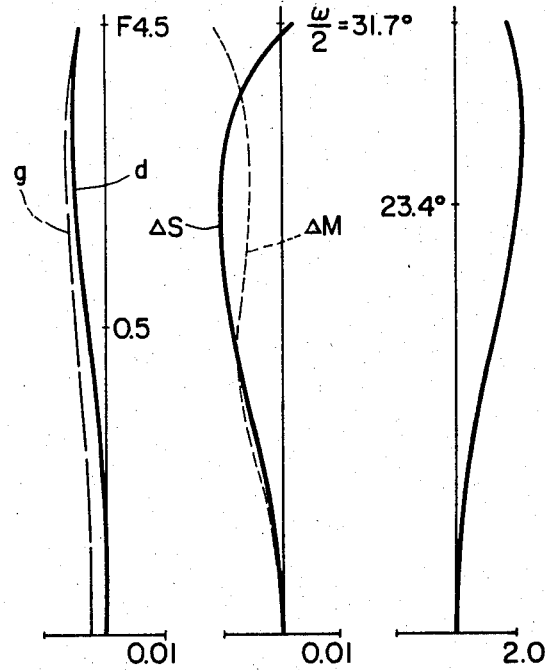
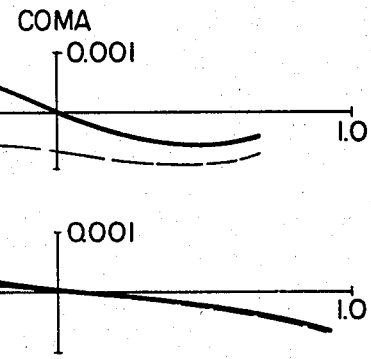

FIG. 6
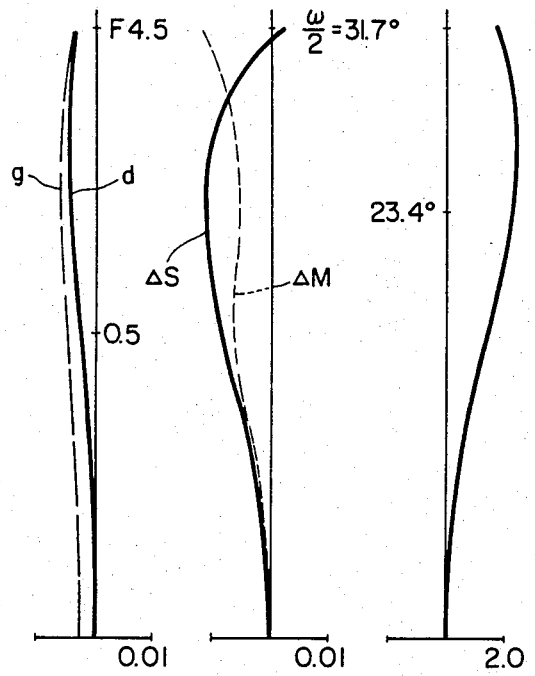
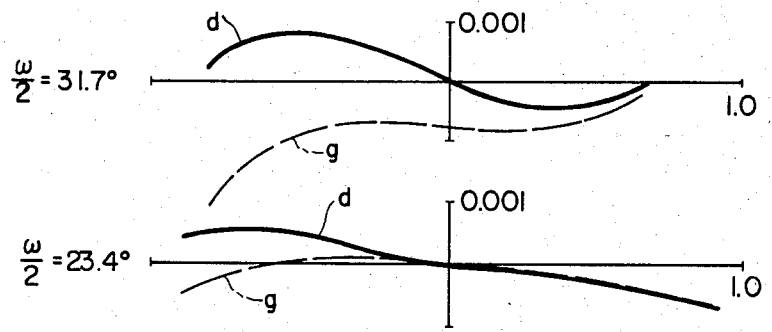

COMPACT PHOTOGRAPHIC CAMERA LENS SYSTEM HAVING A SHORT OVERALL LENGTH

BACKGROUND OF THE INVENTION (a) Field of the Invention

The present invention relates to a compact photographic camera lens system using 35 mm-size film designed for a field angle of at least 60° and an F number of 4.5, and so adapted as to comprise a small number of lens components, have a short overall length and be favorably corrected in various aberrations by using certain lens components having aspherical surfaces.

(b) Description of the Prior Art

Most of compact photographic camera lens systems using Leica size film are generally designed for a field angle around 63°. In order to design lens systems of this class as very compact systems having telephoto ratios of 1.0 and lower, it is necessary to locate the rear principal point of the entire lens system before the first lens surface. For the purpose of satisfying this requirement, it is considered to adopt a lens type generally used as telephoto lenses comprising a front lens group designed as a converging lens system and a rear lens group designed as a diverging lens system within a single lens system.

In case of the general telephoto type lens systems, however, field angles requiring good image quality are far narrower than 63°. In order to design the lens system mentioned as the object of the present invention, it is therefore required to favorably correct aberrations over a wide range up to a field angle of 63°. That is to say, correction of offaxial aberrations poses an important problem.

SUMMARY OF THE INVENTION

A general object of the present invention is to provide a compact photographic lens system having a telephoto ratio smaller than 1.0 which is so adapted as to have a very short overall length by using four components of four lens elements and favorably correct offaxial aberrations by using aspherical surfaces as both the surfaces of a fourth lens component, thereby assuring good image over a wide field angle around 63°.

The lens system according to the present invention comprises four lens components: a first positive meniscus lens component having a convex surface on the object side, a second biconcave lens component, a third biconvex lens component and a fourth negative meniscus lens component having a concave surfaces on the object side. The lens system according to the present invention is so designed as to satisfy the following conditions (1) through (6) and adopts aspherical surfaces as both the surfaces of the fourth lens component:

(1) $0.45f < f_{123} < 0.58f$
(2) $0.45f < -f_4 < 0.9f$
(3) $0.075f < d_5 < 0.12f$
(4) $0.011f < d_2 < 0.043f$
(5) $1.45 < n_1 < 1.63$, $1.46 < n_4 < 1.75$
(6) $\nu_3 < 58.0$ wherein the reference symbol f represents focal length of the entire lens system as a whole, the reference symbol $f_{123}$ designates focal length of a lens group consisting of said first through third lens components, the reference symbol $f_4$ denotes focal length of said fourth lens component, the reference symbol $d_5$ represent thickness of said third lens component, the reference symbol $d_2$ designates airspace reserved between said first and second lens components, the reference symbols $n_1$ and $n_4$ denote refractive indices of said first and fourth lens components respectively and the reference symbol $\nu_3$ represents Abbe's number of said third lens component.

In the lens system according to the present invention, both the surfaces of said fourth lens component are designed as aspherical surfaces as already described above. When the optical axis and the direction perpendicular to the optical axis are taken as abscissa and ordinate respectively, and radii of curvature on both the surfaces of said fourth lens component in the vicinity of optical axis (radius of curvature on the standard spherical surface) are represented by $r_7$ and $r_8$ respectively, the shape of said aspherical surfaces is expressed by the following formula (7).

$$X_i = \frac{y_i^2}{r_i + r_i\sqrt{1 - (y_i/r_i)^2}} + A_i y_i^4 + B_i y_i^6 + C_i y_i^8 + D_i y_i^{10} \quad (7)$$

wherein $A_i$, $B_i$, $C_i$ and $D_i$ (i=7, 8) are constants within the ranges defined below:

$A_7 > -10f^{-3}$, $B_7 > -10^3 f^{-5}$, $C_7 > -10^3 f^{-7}$, $D_7 > -10^4 f^{-9}$ $A_8 < -10^{-1} f^{-3}$, $B_8 < 10f^{-5}$, $C_8 < -10^2 f^{-7}$, $D_8 < -10^2 f^{-9}$

In order to obtain a telephoto ratio of smaller than 1.0 as are of the general object of the present invention, the lens system according to the present invention is designed by adopting a telephoto type which comprises a front converging lens group consisting of a first, a second and a third lens components and a rear lens group consisting only of a fourth lens component, and selecting focal length $f_{123}$ of said front lens group within the range defined by the condition (1) and focal length $f_4$ of said rear lens group within the range defined by the condition (2). In other words, the upper limits have been defined for both the $f_{123}$ and $f_4$ for the purpose of minimizing telephoto ratio though both $f_{123}$ and $f_4$ should preferably be long for correcting spherical aberration and astigmatism. If the upper limits of the conditions (1) and (2) are exceeded, telephoto ratio will be too large to accomplish the first general object of the present invention. If the lower limits of the conditions (1) and (2) are exceeded respectively, it will be difficult to correct spherical aberration and astigmatism. The condition (3) has been adopted for defining thickness of the third lens component. When thickness of this lens component is reduced until the lower limit of the condition (3) is exceeded with aberrations kept correct favorably, pin cushion type distortion and astigmatism are apt to be produced, thereby making is difficult to correct aberrations with good balance. When thickness of the third lens component is increased until the upper limit of the condition (3) is exceeded, in contrast, the lens system will have a long overall length, thereby making it impossible to satisfy the requirement for compact lens system. Since the aspherical surfaces have been adopted for the fourth lens component which is not so effective for correcting paraxial aberrations, $d_2$ is important for correction of paraxial aberrations. The condition (4) has been defined for this purpose. If $d_2$ exceeds the upper limit of 0.043f of the condition (4), spherical aberration and longitudinal chromatic aberration are apt to be undercorrected, resulting in undesirable effect for correction of these aberrations. If the lower limit of 0.011f of the condition (4) is exceeded, in contrast, the image side surface of the first lens component and the object side surface of the second lens component will produce mechanical interference therebetween and will have small effective diameters, thereby resulting in undesirable effect.

The condition (5) defines refractive indices of glass materials to be used for the first and fourth lens components. If $n_1$ exceeds the upper limit of 1.63 and $n_4$ is smaller than the lower limit of 1.46, astigmatism will be aggravated at large field angle and curvature of field will be aggravated especially in the sagital direction. If $n_1$ is smaller than the lower limit of 1.45, it will be difficult to correct spherical aberration. If $n_4$ exceeds the upper limit of 1.75, Petzval's sum will undesirably be increased.

The condition (6) defines Abbe's number of the third lens component which is to correct coma overcorrected at shorter wavelengths by the second lens component. If $\nu_3$ exceeds 58.0 defined by the condition (6), coma will be overcorrected at the shorter wavelengths by the second lens component.

Offaxial aberrations which cannot be corrected sufficiently with the spherical surfaces even by defining the conditions (1) through (6) in the lens system having the above-described composition are corrected by using the aspherical surfaces defined by the formula (7) as both the surfaces of the fourth lens component. In a lens system having such a composition as that of the lens system according to the present invention, pin cushion type distortion is apt to be produced by the rear lens group and, if is attempted to correct the distortion by the front lens group, aberrations at marginal portion of field angle (especially distortion and coma) cannot be corrected sufficiently, thereby degrading balance among the aberrations. Especially, lateral aberration due to upper ray has a large positive value, thereby producing flare. In order to correct the above-mentioned two types of aberrations, it is preferable to use aspherical surfaces on the fourth lens component. The image side surface of the fourth lens component is designed as an aspherical surface deviated on the object side from the standard spherical surface so as to weaken upward refractive force for the offaxial rays without changing power of this lens component. This aspherical surface should preferably be the one defined by the formula (7) and having its constants within the ranges of $A_8 < -10^{-1}f^{-3}$, $B_8 < 10f^{-5}$, $C_8 < -10^2f^{-7}$, $D_8 < -10^2f^{-9}$ respectively.

Further, the object side surface of the fourth lens component has effect which is far lower on aberrations due to the rays having large field angles than that of the image side surface of the fourth lens component, nearly equal on aberrations due to the rays around the paraxial ray, and rather larger on aberrations due to paraxial rays than that of the image side surface of the fourth lens component. Though the object side surface of the fourth lens component should desirably be deviated slightly toward the object side for compensating undercorrection of the aberrations due to the ray around the paraxial ray, too large deviation from the standard spherical surface will produce unbalance between aberrations due to the rays around the paraxial ray and those at marginal portions of field angle. Therefore, the object side surface of the fourth lens component should be the aspherical surface defined by the formula (7) and having constants within the ranges of $A_7 > -10f^{-3}$, $B_7 > -10^3f^{-5}$, $C_7 > -10^3f^{-7}$, $D_7 > -10^4f^{-9}$.

BRIEF DESCRIPTION OF THE DRAWINGS

FIG. 3 through FIG. 9 show curves illustrating the aberration characteristics of the Embodiments 1 through 7 of the present invention.

DESCRIPTION OF THE PREFERRED EMBODIMENTS

Figure 1:
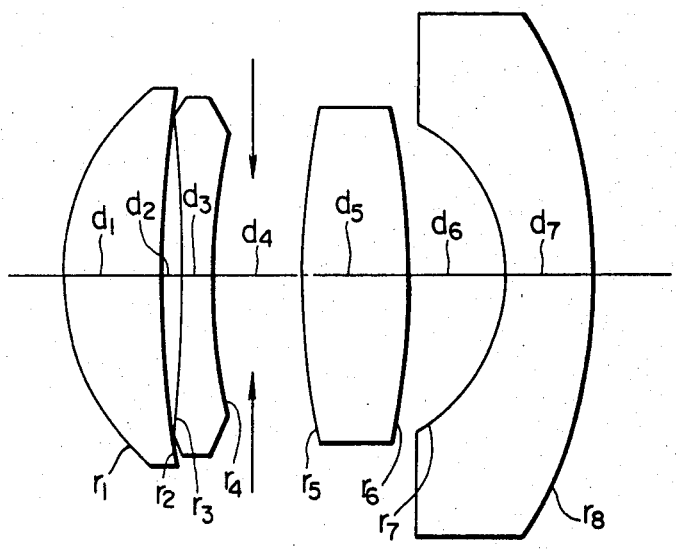
FIG. 1 shows a sectional diagram illustrating composition of Embodiments 1, 2, 3, 4, 6 and 7 of the compact photograpic camera lens system according to the present invention.

Now, numerical data for compact photographic camera lens systems will be described as some preferred embodiments of the present invention:

Embodiment 1:

$r_1 = 0.24212$
  $d_1 = 9.714 \times 10^{-2}$  $n_1 = 1.56873$  $\nu_1 = 63.16$
$r_2 = 0.92339$
  $d_2 = 1.500 \times 10^{-2}$
$r_3 = -1.91610$
  $d_3 = 3.174 \times 10^{-2}$  $n_2 = 1.80518$  $\nu_2 = 25.43$
$r_4 = 0.92359$
  $d_4 = 8.043 \times 10^{-2}$
$r_5 = 0.69460$
  $d_5 = 1.041 \times 10^{-1}$  $n_3 = 1.56883$  $\nu_3 = 56.14$
$r_6 = -0.72009$
  $d_6 = 9.009 \times 10^{-2}$
$r_7 = -0.17270$
(aspherical surface)
  $d_7 = 8.549 \times 10^{-2}$  $n_4 = 1.48749$  $\nu_4 = 70.15$
$r_8 = -0.47943$
(aspherical surface)
  $A_7 = -3.8560 \times 10^0$  $B_7 = -9.2270 \times 10^1$
  $C_7 = -5.6571 \times 10^2$  $D_7 = -4.3708 \times 10^3$
  $A_8 = -2.0661 \times 10^0$  $B_8 = -3.7638 \times 10^0$
  $C_8 = -2.1453 \times 10^2$  $D_8 = -8.9771 \times 10^2$
$f = 1.0$  $\omega = 63.4°$  $f_{123} = 0.528$  $f_4 = -0.609$
  $F_{NO} = 4.5$
telephoto ratio = 0.961

Embodiment 2:

$r_1 = 0.23644$
  $d_1 = 9.714 \times 10^{-2}$  $n_1 = 1.56384$  $\nu_1 = 60.69$
$r_2 = 0.98478$
  $d_2 = 1.463 \times 10^{-2}$
$r_3 = -1.86238$
  $d_3 = 3.588 \times 10^{-2}$  $n_2 = 1.80518$  $\nu_2 = 25.43$
$r_4 = 0.79961$
  $d_4 = 7.640 \times 10^{-2}$
$r_5 = 0.69927$
  $d_5 = 1.085 \times 10^{-1}$  $n_3 = 1.66755$  $\nu_3 = 41.93$
$r_6 = -0.89227$
  $d_6 = 9.165 \times 10^{-2}$
$r_7 = -0.17861$
(aspherical surface)
  $d_7 = 5.940 \times 10^{-2}$  $n_4 = 1.72916$  $\nu_4 = 54.68$
$r_8 = -0.34720$
(aspherical surface)
  $A_7 = -6.0531 \times 10^0$  $B_7 = -9.2123 \times 10^1$
  $C_7 = -5.7675 \times 10^2$  $D_7 = -4.9484 \times 10^3$
  $A_8 = -3.0154 \times 10^0$  $B_8 = -6.4991 \times 10^0$
  $C_8 = -2.1429 \times 10^2$  $D_8 = -8.9739 \times 10^2$
$f = 1.0$  $\omega = 63.4°$  $f_{123} = 0.519$  $f_4 = -0.593$
  $F_{NO} = 4.5$
telephoto ratio = 0.961

Embodiment 3:

$r_1 = 0.23506$
  $d_1 = 8.857 \times 10^2$  $n_1 = 1.56873$  $\nu_1 = 63.16$
$r_2 = 0.86846$
  $d_2 = 1.822 \times 10^{-2}$
$r_3 = -2.16574$
  $d_3 = 4.106 \times 10^{-2}$  $n_2 = 1.80518$  $\nu_2 = 25.43$
$r_4 = 0.82966$
  $d_4 = 7.211 \times 10^{-2}$
$r_5 = 0.70363$ $d_5 = 1.003 \times 10^{-1}$   $n_3 = 1.60717$   $\nu_3 = 40.34$
$r_6 = -0.85755$
 $d_6 = 9.114 \times 10^{-2}$
$r_7 = -0.16744$
(aspherical surface)
 $d_7 = 8.537 \times 10^{-2}$   $n_4 = 1.49109$   $\nu_4 = 57.00$
$r_8 = -0.41642$
(aspherical surface)
 $A_7 = -3.1779 \times 10^0$   $B_7 = -2.3246 \times 10^2$
 $C_7 = -5.6440 \times 10^2$   $D_7 = -4.2459 \times 10^3$
 $A_8 = -2.2325 \times 10^0$   $B_8 = -1.4618 \times 10^1$
 $C_8 = -2.1463 \times 10^2$   $D_8 = -8.9779 \times 10^2$
$f = 1.0$   $\omega = 63.4°$   $f_{123} = 0.534$   $f_4 = -0.643$
 $F_{NO} = 4.5$
telephoto ratio = 0.964

Embodiment 4:

$r_1 = 0.24180$
 $d_1 = 9.714 \times 10^{-2}$   $n_1 = 1.56384$   $\nu_1 = 60.69$
$r_2 = 1.09721$
 $d_2 = 1.577 \times 10^{-2}$
$r_3 = -2.08314$
 $d_3 = 3.191 \times 10^{-2}$   $n_2 = 1.80518$   $\nu_2 = 25.43$
$r_4 = 0.79013$
 $d_4 = 8.120 \times 10^{-2}$
$r_5 = 0.72829$
 $d_5 = 1.044 \times 10^{-1}$   $n_3 = 1.60717$   $\nu_3 = 40.34$
$r_6 = -0.81360$
 $d_6 = 9.066 \times 10^{-2}$
$r_7 = -0.17406$
(aspherical surface)
 $d_7 = 8.483 \times 10^{-2}$   $n_4 = 1.49109$   $\nu_4 = 57.00$
$r_8 = -0.44799$
(aspherical surface)
 $A_7 = -4.1639 \times 10^0$   $B_7 = -9.3741 \times 10^1$
 $C_7 = -5.6582 \times 10^2$   $D_7 = -4.3752 \times 10^3$
 $A_8 = -2.0192 \times 10^0$   $B_8 = -4.6493 \times 10^0$
 $C_8 = -2.1453 \times 10^2$   $D_8 = -8.9771 \times 10^2$
$f = 1.0$   $\omega = 63.4°$   $f_{123} = 0.539$   $f_4 = -0.645$
 $F_{NO} = 4.5$
telephoto ratio = 0.967

Embodiment 5:

$r_1 = 0.22289$
 $d_1 = 9.428 \times 10^{-2}$   $n_1 = 1.56873$   $\nu_1 = 63.16$
$r_2 = 0.51215$
 $d_2 = 3.743 \times 10^{-2}$
$r_3 = -1.31230$
 $d_3 = 3.003 \times 10^{-2}$   $n_2 = 1.80518$   $\nu_2 = 25.43$
$r_4 = 0.72485$
 $d_4 = 3.506 \times 10^{-2}$
$r_5 = 0.46873$
 $d_5 = 8.083 \times 10^{-2}$   $n_3 = 1.58144$   $\nu_3 = 40.75$
$r_6 = -0.74849$
 $d_6 = 1.106 \times 10^{-1}$
$r_7 = -0.14270$
(aspherical surface)
 $d_7 = 8.374 \times 10^{-2}$   $n_4 = 1.49149$   $\nu_4 = 56.4$
$r_8 = -0.25333$
(aspherical surface)
 $A_7 = 1.3766 \times 10^0$   $B_7 = -2.3485 \times 10^2$
 $C_7 = -5.6487 \times 10^2$   $D_7 = -4.2770 \times 10^3$
 $A_8 = -1.1559 \times 10^{-1}$   $B_8 = -4.9287 \times 10^1$
 $C_8 = -2.1482 \times 10^2$   $D_8 = -8.9905 \times 10^2$
$f = 1.0$   $\omega = 63.4°$   $f_{123} = 0.568$   $f_4 = -0.884$
 $F_{NO} = 4.5$
telephoto ratio = 0.983

Embodiment 6:

$r_1 = 0.26168$
 $d_1 = 9.710 \times 10^{-2}$   $n_1 = 1.60729$   $\nu_1 = 59.38$
$r_2 = 1.14610$
 $d_2 = 1.908 \times 10^{-2}$
$r_3 = -3.39178$
 $d_3 = 3.590 \times 10^{-2}$   $n_2 = 1.80518$   $\nu_2 = 25.43$
$r_4 = 0.74500$
 $d_4 = 9.119 \times 10^{-2}$
$r_5 = 0.73971$
 $d_5 = 1.100 \times 10^{-1}$   $n_3 = 1.66446$   $\nu_3 = 35.83$
$r_6 = -1.35693$
 $d_6 = 9.770 \times 10^{-2}$
$r_7 = -0.18434$
(aspherical surface)
 $d_7 = 9.010 \times 10^{-2}$   $n_4 = 1.62588$   $\nu_4 = 35.70$
$r_8 = -0.35832$
(aspherical surface)
 $A_7 = -4.3145 \times 10^0$   $B_7 = -1.0622 \times 10^2$
 $C_7 = -5.6538 \times 10^2$   $D_8 = -4.3456 \times 10^3$
 $A_8 = -1.9999 \times 10^0$   $B_8 = -3.5279 \times 10^{-1}$
 $C_8 = -2.1455 \times 10^2$   $D_8 = -8.9771 \times 10^2$
$f = 1.0$   $\omega = 63.4°$   $f_{123} = 0.567$   $f_4 = -0.758$
 $F_{NO} = 4.5$
telephoto ratio = 0.988

Embodiment 7:

$r_1 = 0.21257$
 $d_1 = 8.430 \times 10^{-2}$   $n_1 = 1.48749$   $\nu_1 = 70.15$
$r_2 = 0.72602$
 $d_2 = 1.715 \times 10^{-2}$
$r_3 = -0.86105$
 $d_3 = 2.329 \times 10^{-2}$   $n_2 = 1.80518$   $\nu_2 = 25.43$
$r_4 = 1.6068$
 $d_4 = 6.630 \times 10^{-2}$
$r_5 = 0.63115$
 $d_5 = 9.676 \times 10^{-2}$   $n_3 = 1.60717$   $\nu_3 = 40.34$
$r_6 = -0.46101$
 $d_6 = 8.295 \times 10^{-2}$
$r_7 = -0.16849$
(aspherical surface)
 $d_7 = 7.910 \times 10^{-2}$   $n_4 = 1.49109$   $\nu_4 = 57.00$
$r_8 = -0.72382$
(aspherical surface)
 $A_7 = -4.9075 \times 10^0$   $B_7 = -7.2806 \times 10^1$
 $C_7 = -5.6623 \times 10^2$   $D_7 = -4.4030 \times 10^3$
 $A_8 = -2.0997 \times 10^0$   $B_8 = +8.5028 \times 10^0$
 $C_8 = -2.1448 \times 10^2$   $D_8 = -8.9763 \times 10^2$
$f = 1.0$   $\omega = 63.4°$   $f_{123} = 0.451$   $f_4 = -0.469$
 $F_{NO} = 4.5$
telephoto ratio = 0.961 wherein the reference symbols $r_1$ through $r_8$ represent radii of curvature on the surfaces of the respective lens elements, the reference symbols $d_1$ through $d_7$ designate thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

Figure 2:
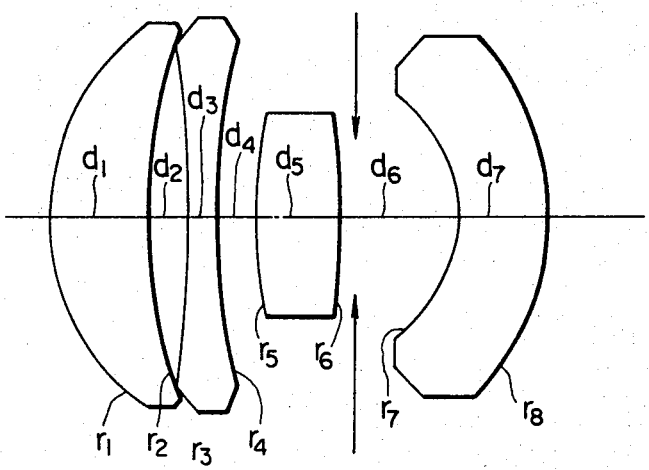
FIG. 2 shows a sectional diagram illustrating composition of Embodiment 5 of the present invention.
Figure 3:
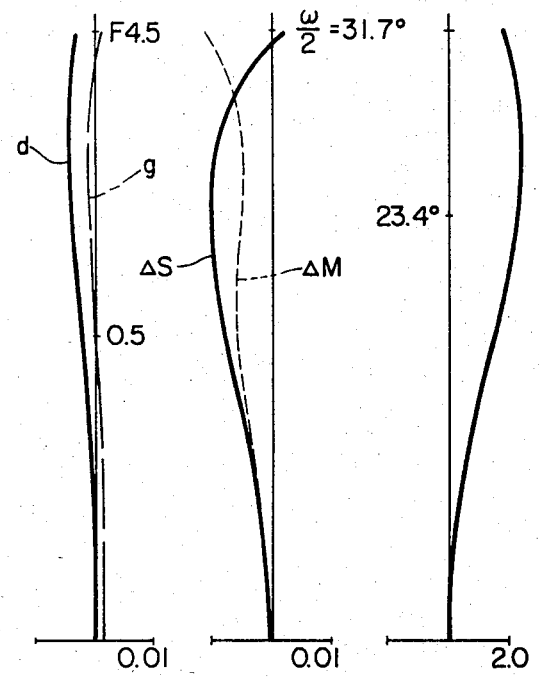
Figure 7:
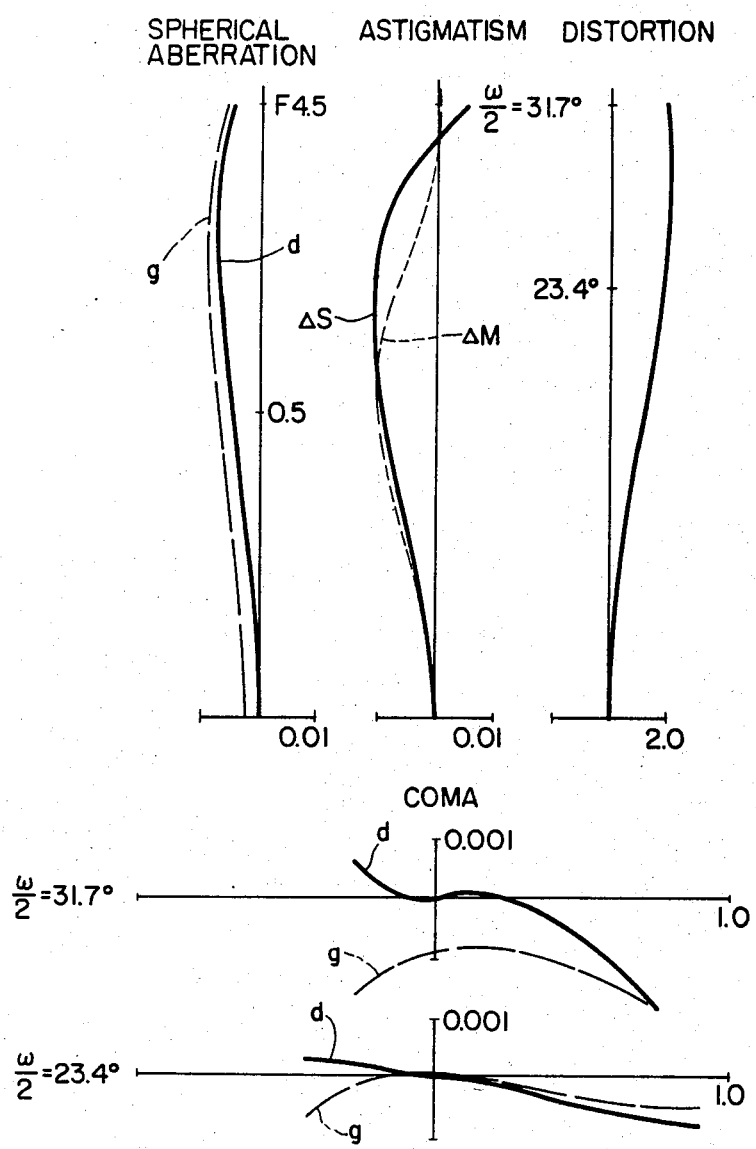
Figure 8:
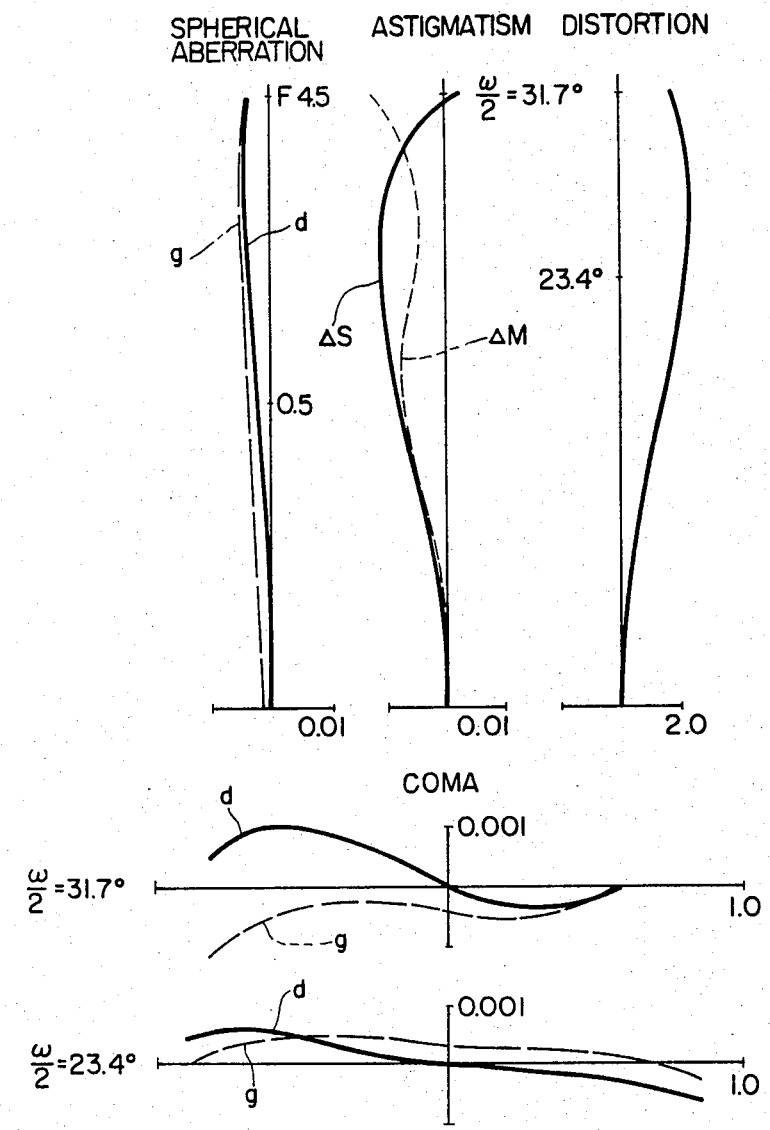
Figure 9:
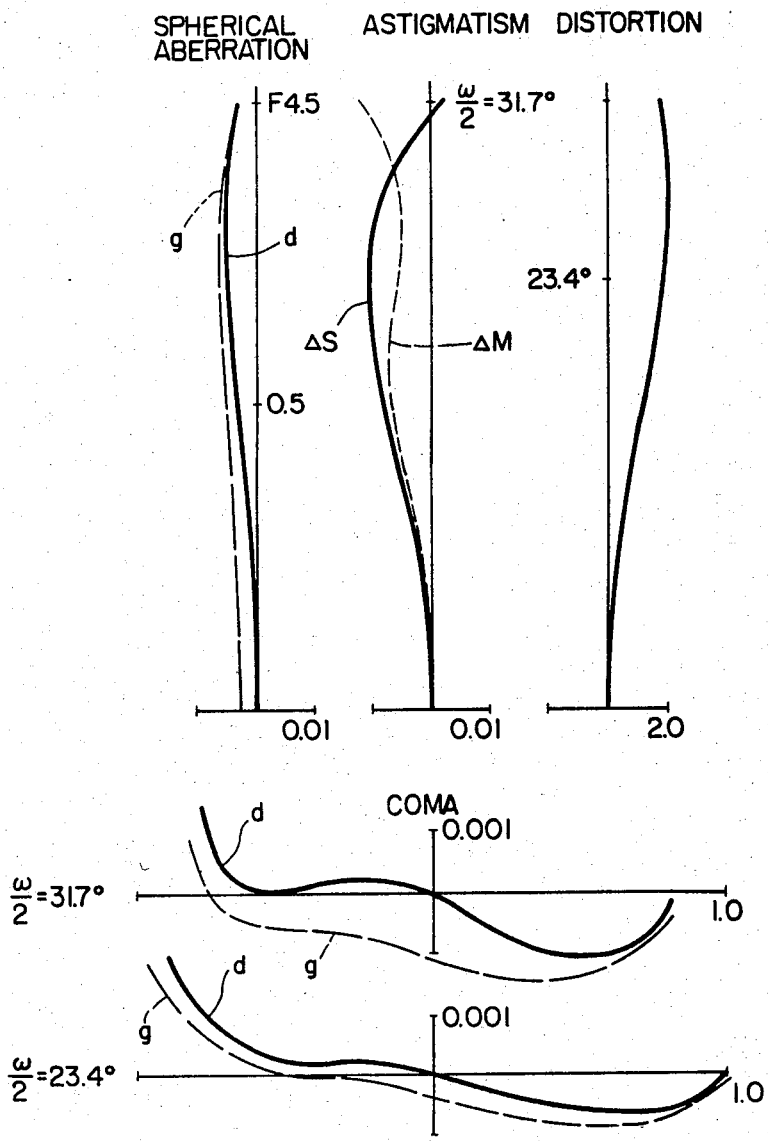

Out of these embodiments, the Embodiments 1, 2, 3, 4, 6 and 7 have the composition illustrated in FIG. 1 and comprise a stop arranged between the second and third lens components. The Embodiment 5 has the composition illustrated in FIG. 2 and comprise a stop arranged between the third and fourth lens components.

I claim:

1. A compact photographic camera lens system having a short overall length comprising a first positive meniscus lens component having a convex surface on the object side, a second biconcave lens component, a third biconvex lens component and a fourth negative meniscus lens component, said lens system being so designed as to satisfy the following conditions and said fourth lens component having aspherical surfaces on both the sides defined by the following formula (7):

$0.45f < f_{123} < 0.58f$ (1)

$0.45f < -f_4 < 0.9f$ (2)

$0.075f < d_5 < 0.12f$ (3)

$0.011f < d_2 < 0.043f$ (4)

$1.45 < n_1 < 1.63, 1.46 < n_4 < 1.75$ (5)

$\nu_3 < 58.0$ (6)

-continued- $$X_i = \frac{y_i^2}{r_i + r_i\sqrt{1 - (y_i/r_i)^2}} + A_i y_i^4 + B_i y_i^6 + C_i y_i^8 + D_i y_i^{10} \quad (7)$$

wherein the reference symbol f represents focal length of the entire lens system as a whole, the reference symbol $f_{123}$ designates focal length of the lens group consisting of said first through third lens components as a whole, the reference symbol $f_4$ denotes focal length of said fourth lens component, the reference symbol $d_2$ represents airspace reserved between said first and second lens components, the reference symbol $d_5$ designates thickness of said third lens component, the reference symbols $n_1$ and $n_4$ denote refractive indices of said first and fourth lens components, the reference symbol $\nu_3$ represents Abbe's number of said third lens component, and the reference symbols $A_i$, $B_i$, $C_i$ and $D_i$ designate constants within the ranges defined as follows:
$A_7 > -10f^{-3}$, $B_7 > -10^3 f^{-5}$, $C_7 > -10^3 f^{-7}$, $D_7 > -10^4 f^{-9}$; $A_8 < -10^{-1} f^{-3}$, $B_8 < 10 f^{-5}$, $C_8 < -10^2 f^{-7}$, $D_8 < -10^2 f^{-9}$.

2. A compact photographic camera lens system according to claim 1 having the following numerical data:

---

$r_1 = 0.24212$
 $d_1 = 9.714 \times 10^{-2}$  $n_1 = 1.56873$  $\nu_1 = 63.16$
$r_2 = 0.92339$
 $d_2 = 1.500 \times 10^{-2}$
$r_3 = -1.91610$
 $d_3 = 3.174 \times 10^{-2}$  $n_2 = 1.80518$  $\nu_2 = 25.43$
$r_4 = 0.92359$
 $d_4 = 8.043 \times 10^{-2}$
$r_5 = 0.69460$
 $d_5 = 1.041 \times 10^{-1}$  $n_3 = 1.56883$  $\nu_3 = 56.14$
$r_6 = -0.72009$
 $d_6 = 9.009 \times 10^{-2}$
$r_7 = 0.17270$
(aspherical surface)
 $d_7 = 8.549 \times 10^{-2}$  $n_4 = 1.48749$  $\nu_4 = 70.15$
$r_8 = -0.47943$
(aspherical surface)
 $A_7 = -3.8560 \times 10^0$  $B_7 = -9.2270 \times 10^1$
 $C_7 = -5.6571 \times 10^2$  $D_7 = -4.3708 \times 10^3$
 $A_8 = -2.0661 \times 10^0$  $B_8 = -3.7638 \times 10^0$
 $C_8 = -2.1453 \times 10^2$  $D_8 = -8.9771 \times 10^2$
$f = 1.0$  $\omega = 63.4°$  $f_{123} = 0.528$  $f_4 = -0.609$
 $F_{NO} = 4.5$
telephoto ratio = 0.961

--- wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

3. A compact photographic camera lens system according to claim 1 having the following numerical data:

---

$r_1 = 0.23644$
 $d_1 = 9.714 \times 10^{-2}$  $n_1 = 1.56384$  $\nu_1 = 60.69$
$r_2 = 0.98478$
 $d_2 = 1.463 \times 10^{-2}$
$r_3 = -1.86238$
 $d_3 = 3.588 \times 10^{-2}$  $n_2 = 1.80518$  $\nu_2 = 25.43$
$r_4 = 0.79961$
 $d_4 = 7.640 \times 10^{-2}$
$r_5 = 0.69927$
 $d_5 = 1.085 \times 10^{-1}$  $n_3 = 1.66755$  $\nu_3 = 41.93$
$r_6 = -0.89227$
 $d_6 = 9.165 \times 10^{-2}$
$r_7 = -0.17861$
(aspherical surface)
 $d_7 = 5.940 \times 10^{-2}$  $n_4 = 1.72916$  $\nu_4 = 54.68$
$r_8 = -0.34720$
(aspherical surface)
 $A_7 = -6.0531 \times 10^0$  $B_7 = -9.2123 \times 10^1$
 $C_7 = -5.7675 \times 10^2$  $D_7 = -4.9484 \times 10^3$
 $A_8 = -3.0154 \times 10^0$  $B_8 = -6.4991 \times 10^0$
 $C_8 = -2.1429 \times 10^2$  $D_8 = -8.9739 \times 10^2$
$f = 1.0$  $\omega = 63.4°$  $f_{123} = 0.519$  $f_4 = -0.593$
 $F_{NO} = 4.5$
telephoto ratio = 0.961

--- wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

4. A compact photographic camera lens system according to claim 1 having the following numerical data:

---

$r_1 = 0.23506$
 $d_1 = 8.857 \times 10^2$  $n_1 = 1.56873$  $\nu_1 = 63.16$
$r_2 = 0.86846$
 $d_2 = 1.822 \times 10^{-2}$
$r_3 = -2.16574$
 $d_3 = 4.106 \times 10^{-2}$  $n_2 = 1.80518$  $\nu_2 = 25.43$
$r_4 = 0.82966$
 $d_4 = 7.211 \times 10^{-2}$
$r_5 = 0.70363$
 $d_5 = 1.003 \times 10^{-1}$  $n_3 = 1.60717$  $\nu_3 = 40.34$
$r_6 = -0.85755$
 $d_6 = 9.114 \times 10^{-2}$
$r_7 = -0.16744$
(aspherical surface)
 $d_7 = 8.537 \times 10^{-2}$  $n_4 = 1.49109$  $\nu_4 = 57.00$
$r_8 = -0.41642$
(aspherical surface)
 $A_7 = -3.1779 \times 10^0$  $B_7 = -2.3246 \times 10^2$
 $C_7 = -5.6440 \times 10^2$  $D_7 = -4.2459 \times 10^3$
 $A_8 = -2.2325 \times 10^0$  $B_8 = -1.4618 \times 10^1$
 $C_8 = -2.1463 \times 10^2$  $D_8 = -8.9779 \times 10^2$
$f = 1.0$  $\omega = 63.4°$  $f_{123} = 0.534$  $f_4 = -0.643$
 $F_{NO} = 4.5$
telephoto ratio = 0.962

--- wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

5. A compact photographic camera lens system according to claim 1 having the following numerical data:

---

$r_1 = 0.24180$
 $d_1 = 9.714 \times 10^{-2}$  $n_1 = 1.56384$  $\nu_1 = 60.69$
$r_2 = 1.09721$
 $d_2 = 1.577 \times 10^{-2}$ -continued

```
r_3 = -2.08314
       d_3 = 3.191 × 10^-2    n_2 = 1.80518    ν_2 = 25.43
r_4 = 0.79013
       d_4 = 8.120 × 10^-2
r_5 = 0.72829
       d_5 = 1.044 × 10^-1    n_3 = 1.60717    ν_3 = 40.34
r_6 = -0.81360
       d_6 = 9.066 × 10^-2
r_7 = -0.17406
(aspherical surface)
       d_7 = 8.483 × 10^-2    n_4 = 1.49109    ν_4 = 57.00
r_8 = -0.44799
(aspherical surface)
       A_7 = -4.1639 × 10^0    B_7 = -9.3741 × 10^1
       C_7 = -5.6582 × 10^2    D_7 = -4.3752 × 10^3
       A_8 = -2.0192 × 10^0    B_8 = -4.6493 × 10^0
       C_8 = -2.1453 × 10^2    D_8 = -8.9771 × 10^2
       f = 1.0    ω = 63.4°    f_123 = 0.539    f_4 = -0.645
               F_NO = 4.5
       telephoto ratio = 0.967
``` wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

6. A compact photographic camera lens system according to claim 1 having the following numerical data:

```
r_1 = 0.22289
       d_1 = 9.428 × 10^-2    n_1 = 1.56873    ν_1 = 63.16
r_2 = 0.51215
       d_2 = 3.742 × 10^-2
r_3 = -1.31230
       d_3 = 3.003 × 10^-2    n_2 = 1.80518    ν_2 = 25.43
r_4 = 0.72485
       d_4 = 3.506 × 10^-2
r_5 = 0.46873
       d_5 = 8.083 × 10^-2    n_3 = 1.58144    ν_3 = 40.75
r_6 = -0.74849
       d_6 = 1.106 × 10^-1
r_7 = -0.14270
(aspherical surface)
       d_7 = 8.374 × 10^-2    n_4 = 1.49159    ν_4 = 56.4
r_8 = -0.25333
(aspherical surface)
       A_7 = 1.3766 × 10^0     B_7 = -2.3485 × 10^2
       C_7 = -5.6487 × 10^2    D_7 = -4.2770 × 10^3
       A_8 = -1.1559 × 10^-1   B_8 = -4.9287 × 10^1
       C_8 = -2.1482 × 10^2    D_8 = -8.9905 × 10^2
       f = 1.0    ω = 63.4°    f_123 = 0.568    f_4 = -0.884
               F_NO = 4.5
       telephoto ratio = 0.983
``` wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denotes refractive indices of the respective lens elements and the reference symbols $\nu_1$ through $\nu_4$ represent Abbe's numbers of the respective lens elements.

7. A compact photographic camera lens system according to claim 1 having the following numerical data:

```
r_1 = 0.26168
       d_1 = 9.710 × 10^-2    n_1 = 1.60729    ν_1 = 59.38
r_2 = 1.14610
       d_2 = 1.908 × 10^-2
r_3 = -3.39178
       d_3 = 3.590 × 10^-2    n_2 = 1.80518    ν_2 = 25.43
r_4 = 0.74500
       d_4 = 9.119 × 10^-2
r_5 = 0.73971
       d_5 = 1.100 × 10^-1    n_3 = 1.66446    ν_3 = 35.83
r_6 = -1.35693
       d_6 = 9.770 × 10^-2
r_7 = -0.18434
(aspherical surface)
       d_7 = 9.010 × 10^-2    n_4 = 1.62588    ν_4 = 35.70
r_8 = -0.35832
(aspherical surface)
       A_7 = -4.3145 × 10^0    B_7 = -1.0622 × 10^2
       C_7 = -5.6528 × 10^2    D_8 = -4.3456 × 10^3
       A_8 = -1.9999 × 10^0    B_8 = -3.5279 × 10^-1
       C_8 = -2.1455 × 10^2    D_8 = -8.9771 × 10^2
       f = 1.0    ω = 63.4°    f_123 = 0.567    f_4 = -0.758
               F_NO = 4.5
       telephoto ratio = 0.988
``` wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denotes refractive indices of the respective lens elements and the reference symbols $\nu_1$ through $\nu_4$ represent Abbe's numbers of the respective lens elements.

8. A compact photographic camera lens system according to claim 1 having the following numerical data:

```
r_1 = 0.21257
       d_1 = 8.430 × 10^-2    n_1 = 1.48749    ν_1 = 70.15
r_2 = 0.72602
       d_2 = 1.715 × 10^-2
r_3 = -0.86105
       d_3 = 2.239 × 10^-2    n_2 = 1.80518    ν_2 = 25.43
r_4 = 1.6068
       d_4 = 6.630 × 10^-2
r_5 = 0.63115
       d_5 = 9.676 × 10^-2    n_3 = 1.60717    ν_3 = 40.34
r_6 = -0.46101
       d_6 = 8.295 × 10^-2
r_7 = -0.16849
(aspherical surface)
       d_7 = 7.910 × 10^-2    n_4 = 1.49109    ν_4 = 57.00
r_8 = -0.72382
(aspherical surface)
       A_7 = -4.9075 × 10^0    B_7 = -7.2806 × 10^1
       C_7 = -5.6623 × 10^2    D_7 = -4.4030 × 10^3
       A_8 = -2.0997 × 10^0    B_8 = +8.5028 × 10^0
       C_8 = -2.1448 × 10^2    D_8 = -8.9763 × 10^2
       f = 1.0    ω = 63.4°    f_123 = 0.451    f_4 = ″0.469
               F_NO = 4.5
       telephoto ratio = 0.961
``` wherein the reference symbols $r_1$ through $r_8$ represents radii of curvature on the surfaces of the respective lens components, the reference symbols $d_1$ through $d_7$ designates thicknesses of the respective lens elements and airspaces reserved therebetween, the reference symbols $n_1$ through $n_4$ denote refractive indices of the respective lens elements and the reference symbols $\nu_1$ through $\nu_4$ represent Abbe's numbers of the respective lens elements.

* * * * *